US012114666B2

(12) United States Patent
Giacomini

(10) Patent No.: US 12,114,666 B2
(45) Date of Patent: Oct. 15, 2024

(54) MONITORING SYSTEM

(71) Applicant: WHIRLPOOL CORPORATION, Benton Harbor, MI (US)

(72) Inventor: Neomar Giacomini, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 513 days.

(21) Appl. No.: 16/720,565

(22) Filed: Dec. 19, 2019

(65) Prior Publication Data

US 2021/0186032 A1 Jun. 24, 2021

(51) Int. Cl.
*A21B 3/04* (2006.01)
*A21B 1/40* (2006.01)
*A23L 5/10* (2016.01)
*F27D 21/02* (2006.01)

(52) U.S. Cl.
CPC ............. *A21B 3/04* (2013.01); *A21B 1/40* (2013.01); *A23L 5/15* (2016.08); *F27D 21/02* (2013.01); *A23V 2002/00* (2013.01); *F27D 2021/026* (2013.01)

(58) Field of Classification Search
CPC ..... A21B 3/04; A21B 1/40; A23L 5/15; F27D 21/02; F27D 2021/026; A23V 2002/00
See application file for complete search history.

(56) References Cited

U.S. PATENT DOCUMENTS

| 4,920,948 | A | * | 5/1990 | Koether | G05D 23/20 219/710 |
| 4,924,072 | A | * | 5/1990 | Oslin | F24C 15/325 219/400 |
| 5,619,983 | A | * | 4/1997 | Smith | F24C 15/327 126/369 |
| 6,397,734 | B1 | | 6/2002 | Atzinger | |
| 7,060,941 | B1 | * | 6/2006 | Embury | F24C 7/08 99/468 |
| 7,555,159 | B2 | | 6/2009 | Pishva | |
| 9,644,847 | B2 | | 5/2017 | Bhogal et al. | |
| 10,228,145 | B2 | | 3/2019 | Erbe et al. | |
| 2002/0186302 | A1 | | 12/2002 | Pulkinnen | |
| 2012/0099761 | A1 | | 4/2012 | Yoon et al. | |
| 2014/0026762 | A1 | * | 1/2014 | Riefenstein | H05B 6/6441 99/325 |
| 2017/0074522 | A1 | * | 3/2017 | Cheng | F24C 7/085 |
| 2018/0324908 | A1 | | 11/2018 | Denker et al. | |
| 2019/0053332 | A1 | | 2/2019 | Cheng et al. | |
| 2019/0128531 | A1 | | 5/2019 | Abdoo et al. | |
| 2019/0242584 | A1 | | 8/2019 | Ebert et al. | |

FOREIGN PATENT DOCUMENTS

| DE | 102016107617 A1 | 10/2017 | |
| EP | 2929252 B1 * | 10/2018 | ............... A21B 1/40 |
| EP | 3477206 A1 | 5/2019 | |
| WO | 2014086487 A1 | 6/2014 | |

* cited by examiner

*Primary Examiner* — Steven N Leff
(74) *Attorney, Agent, or Firm* — Price Heneveld LLP

(57) ABSTRACT

A cooking appliance includes a body having a first cavity. A sensor is operably coupled with the first cavity to obtain a first data. A humidifier is in fluid communication with the first cavity to control a relative humidity within the first cavity. A controller is in electric communication with the sensor to receive the first data. The controller detects at least one of a surface condition and a growth condition of a food substrate using the first data.

19 Claims, 9 Drawing Sheets

MONITORING SYSTEM

BACKGROUND OF THE DISCLOSURE

The present disclosure generally relates to a monitoring system, and more specifically, to a food substrate growth monitoring system.

SUMMARY OF THE DISCLOSURE

According to one aspect of the present disclosure, a cooking appliance includes a body having a first cavity. A sensor is operably coupled with the first cavity to obtain a first data. A humidifier is in fluid communication with the first cavity to control a relative humidity within the first cavity. A controller is in electric communication with the sensor to receive the first data. The controller detects at least one of a surface condition and a growth condition of a food substrate using the first data.

According to another aspect of the present disclosure, a monitoring system for an appliance includes a first cavity. A sensor is operably coupled to the first cavity. The sensor has a field of detection within the first cavity to obtain a first data. A controller is in electric communication with the sensor to receive the first data. The controller detects a rate of volume change of a food substrate using the first data. A user-interface is in communication with the controller to receive a notification in response to the first data.

According to yet another aspect of the present disclosure, a method of monitoring food substrate growth includes heating a first cavity to a first temperature. A sensor obtains first data. The sensor obtains a second data. The first and second data are compared to detect a growth condition of a food substrate.

These and other features, advantages, and objects of the present disclosure will be further understood and appreciated by those skilled in the art by reference to the following specification, claims, and appended drawings.

Figure 1:
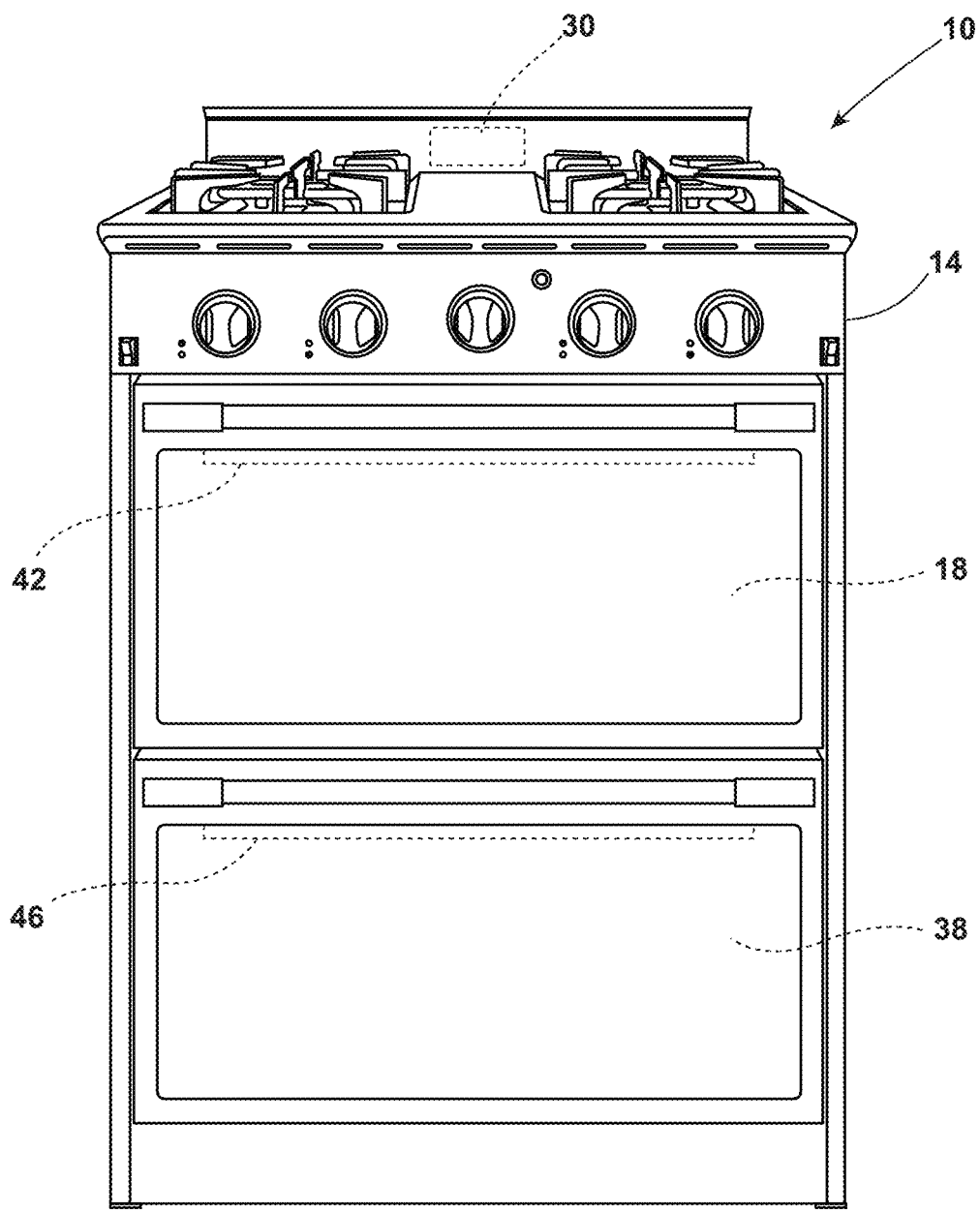
FIG. 1 is a front perspective view of a cooking appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a monitoring system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With reference to FIGS. 1-11, reference numeral 10 generally designates a cooking appliance that includes a body 14 having a first cavity 18. A sensor 22 is operably coupled with the first cavity 18 to obtain a first data. A humidifier 26 is in fluid communication with the first cavity 18 to control a relative humidity of the first cavity 18. A controller 30 is in electric communication with the sensor 22 to receive the first data. The controller 30 detects at least one of a surface condition and a growth condition of a food substrate 34 using the first data.

Referring to FIG. 1, the cooking appliance 10 is illustrated as a double oven having the first cavity 18 and a second cavity 38. The first cavity 18 can include a first heating element 42, and the second cavity 38 can include a second heating element 46. The first and second heating elements 42, 46 may be selectively and independently operated by the controller 30 to heat the corresponding first and second cavities 18, 38. It is contemplated that the first and second heating elements 42, 46 may be the same heating element, or alternatively, may be different heating elements that have different functions. Additionally, the cooking appliance 10 is illustrated as a double oven, however, the first and second cavities 18, 38 may not be included in a single body 14. In such examples, the first and second cavities 18, 38 may be included in two separate cooking appliances 10.

Figure 2:
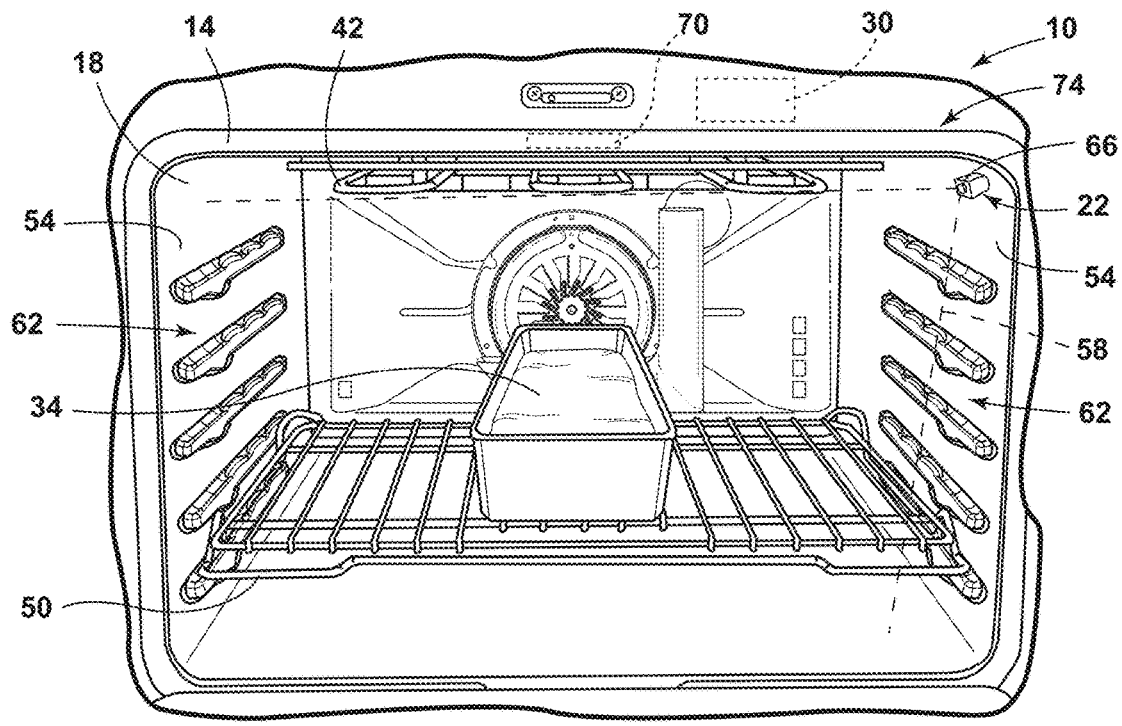
FIG. 2 is a front perspective view of a food substrate in a first growth condition within a cavity of a cooking appliance, according to the present disclosure.
Figure 3:
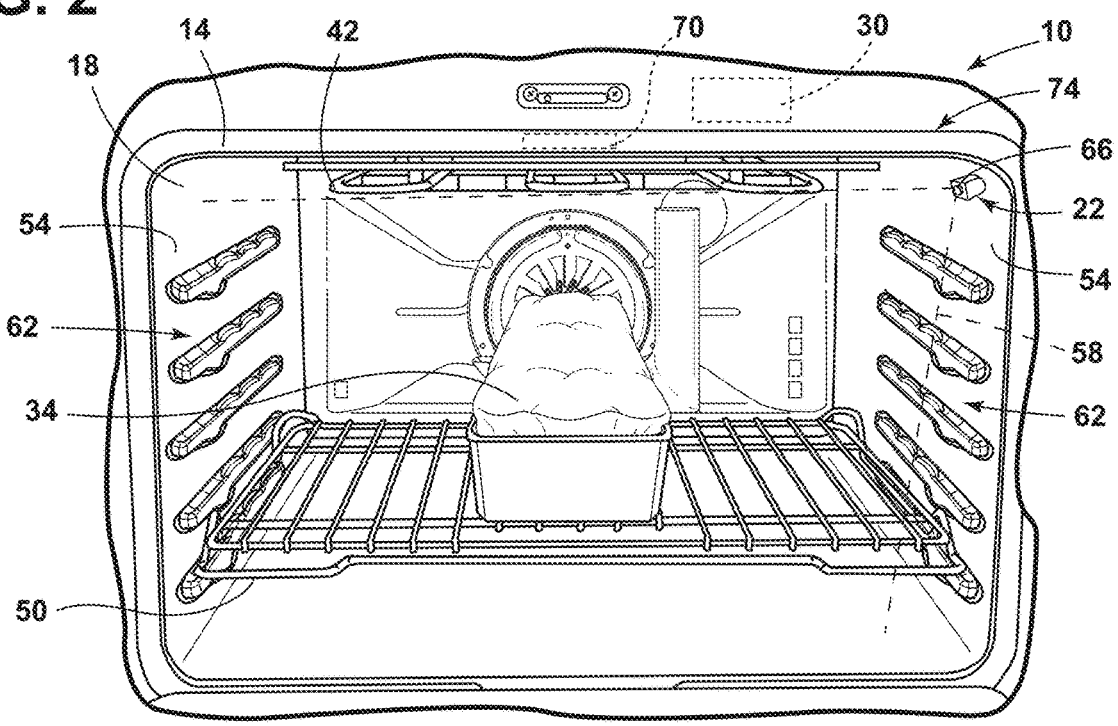
FIG. 3 is a front perspective view of the food substrate of FIG. 2 in a second growth condition.
Figure 4A:
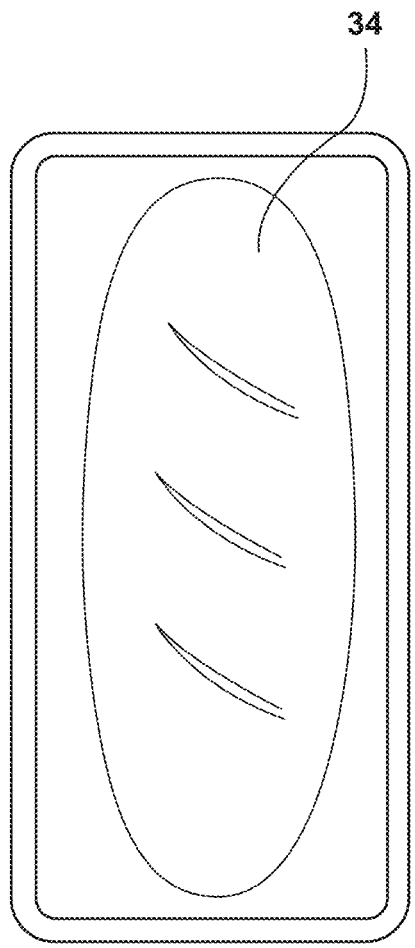
FIG. 4A is a top plan view of a food substrate in a first growth condition, according to the present disclosure.
Figure 4B:
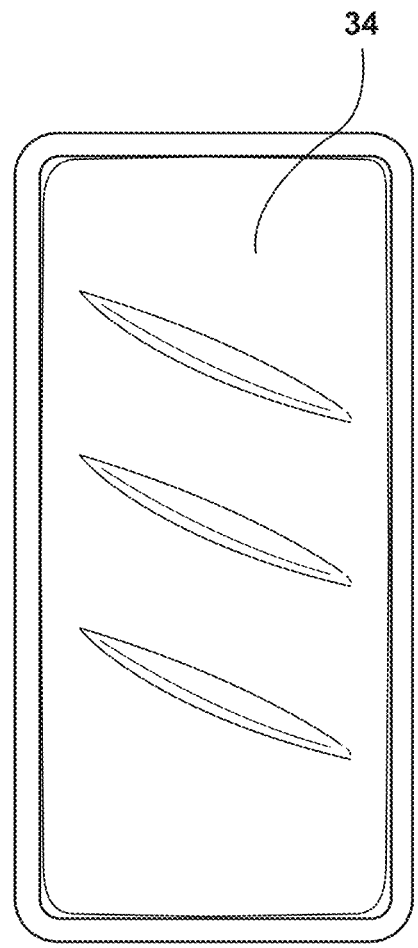
FIG. 4B is a top plan view of the food substrate of FIG. 4A in a second growth condition.

Referring to FIGS. 2 and 3, the first cavity 18 may be included in the body 14, and the food substrate 34 can be supported on a rack 50 within the first cavity 18. In various examples, the sensor 22 may be operably coupled to the first cavity 18 to obtain the first data. As illustrated in the exemplary embodiment of FIGS. 2 and 3, the sensor 22 is positioned on a sidewall 54 of the body 14 and disposed within the first cavity 18. However, it is contemplated that the sensor 22 may be disposed outside the first cavity 18, or on any location along the sidewalls 54, a back wall, or a ceiling of the first cavity 18. In such examples, the sensor 22 may be disposed within a separate chamber in fluid communication with the first cavity 18, disposed behind a window defined in the sidewall 54, disposed elsewhere in the body 14, and/or disposed in another similar configuration, wherein the sensor 22 can still detect or otherwise sense the first data from the first cavity 18. The sensor 22 may have a field of detection 58 that includes a portion, or all, of the first cavity 18. The sensor 22 may obtain the first data from the field of detection 58. In various examples, the field of detection 58 may include the rack 50 and/or the food substrate 34 disposed thereon when the rack 50 and the food substrate 34 are disposed within the first cavity 18.

As illustrated in FIGS. 2 and 3, the body 14 includes two sidewalls 54 that have a plurality of support members 62 coupled thereto. The support members 62 may be spaced at intervals along a height of each of the sidewalls 54 for supporting the rack 50 at different heights within the first cavity 18. In various examples, the field of detection 58 of the sensor 22 may include the rack 50 and the food substrate 34 when the rack 50 is positioned at any height within the first cavity 18.

According to various aspects, the sensor 22 may include an image-based sensor 66. The image-based sensor 66 may be any area type imager, such as, a charge coupled device (CCD) or a complementary metal oxide semiconductor (CMOS) imager, or any type of color or black-and-white camera. The image-based sensor 66 may be configured to obtain the first data within the field of detection 58 in the first cavity 18. In this way, the first data may include an image captured within the field of detection 58. The image may include at least one of a picture, a video, real-time streaming of image data, other transmissions of image data, and/or combinations thereof. The image may be a single image or multiple images. Additionally or alternatively, the image-based sensor 66 may be adjustable. The field of detection 58 may also be adjustable to be broader, narrower, positionally shifted, or any combination thereof. The image-based sensor 66 may receive a signal from the controller 30 based on the first data and/or a user input to adjust an aspect of the image-based sensor 66. In various examples, the image-based sensor 66 may be adjusted to change the scope of the field of detection 58. It is contemplated that the image-based sensor 66 includes one or more lenses, which may be adjusted to change the sharpness and/or quality of the first data obtained by the image-based sensor 66. The first data may be communicated to the controller 30.

The sensor 22 may be a depth-array sensor or depth sensor, such as, for example, a radar, a LIDAR, or another similar depth analysis sensor that can provide the first data to the controller 30. In such examples, the first data may include a depth map of the food substrate 34 captured within the field of detection 58. The depth map can be at least one of a matrix, a vector, and a real-time streaming of depth data. It is contemplated that the cooking appliance 10 may include any type of sensor 22 that provides the first data to the controller 30 for depth sensing and volume estimation.

Referring still to FIGS. 2 and 3, a light source 70 may be operably coupled with the first cavity 18. The light source 70 may be coupled to the body 14, or otherwise configured to emit light into the first cavity 18. The light source 70 can be activated by a user input, or may be automatically activated by the controller 30. In examples where the light source 70 can be automatically activated, the light source 70 may be activated in conjunction with the image-based sensor 66. In this way, the light source 70 may be configured to emit light into the first cavity 18 to illuminate the first cavity 18, while the image-based sensor 66 is obtaining the first data simultaneously. The light source 70 may provide sufficient illumination within the first cavity 18 to allow the image-based sensor 66 to obtain the first data. In a non-limiting example, if the image-based sensor 66 obtains the first data periodically, the light source 70 may periodically illuminate into the first cavity 18. Additionally or alternatively, if the image-based sensor 66 is configured to continuously obtain the first data, the light source 70 may remain activated to continually emit light into the first cavity 18.

In various examples, the light source 70 may emit visible light that has a wavelength in a range of from about 380 nm to about 740 nm, or a mix of wavelengths in this range. The light source 70 may include any form of light source, for example, fluorescent lighting, light emitting diodes (LEDs), organic LEDs (OLEDs), polymer LEDs (PLEDs), laser diodes, quantum dot LEDs (OD-LEDs), solid-state lighting, a hybrid, and/or any other similar device. Any other form of lighting may be utilized within the cooking appliance 10 without departing from the teachings herein. Further, various types of LEDs are suitable for use as the light source 70, including, but not limited to, top-emitting LEDs, side-emitting LEDs, and others. According to various examples, multicolored light sources, such as Red, Green, and Blue (RGB) LEDs that employ red, green, and blue LED packaging may be used to generate various desired colors of light output from a single light source, according to known light color mixing techniques. Moreover, the light source 70 may be configured as a single light source, or alternatively, as more than one light source that can be selectively and independently controlled.

Referring to FIGS. 2-4B, the cooking appliance 10 may include a monitoring system 74 for monitoring growth and/or change of the food substrate 34 within at least the first cavity 18. The monitoring system 74 may include the sensor 22 and the controller 30 operably coupled with the first cavity 18. As illustrated in FIGS. 2 and 4A, the food substrate 34 is bread dough disposed within the first cavity 18 prior to a proofing process. In additional examples, the food substrate 34 may be bread dough, bagel dough, pizza dough, or any other type of dough. The first heating element 42 may be activated by the controller 30 to heat the first cavity 18 to a predetermined temperature, such as a predetermined bread proofing temperature. In various examples, the predetermined bread proofing temperature may be in a range of from about 85° F. to about 90° F. In such examples, the first cavity 18 may be utilized for bread proofing processes or other food warming processes. Additionally or alternatively, the predetermined temperature may be higher or lower for warming, baking, cooking, or otherwise preparing the food substrate 34. Over a predetermined amount of time, the food substrate 34 may increase in volume, as illustrated from FIGS. 2-3 and FIGS. 4A-4B, or otherwise visibly change. The sensor 22 may obtain the first data over the predetermined period of time to monitor a feature of the food substrate, such as the growth and/or change of the food substrate 34. In various examples, the sensor 22 may obtain the first data periodically, or alternatively, the sensor 22 may continuously obtain the first data over the entirety of the predetermined period of time.

Figure 5:
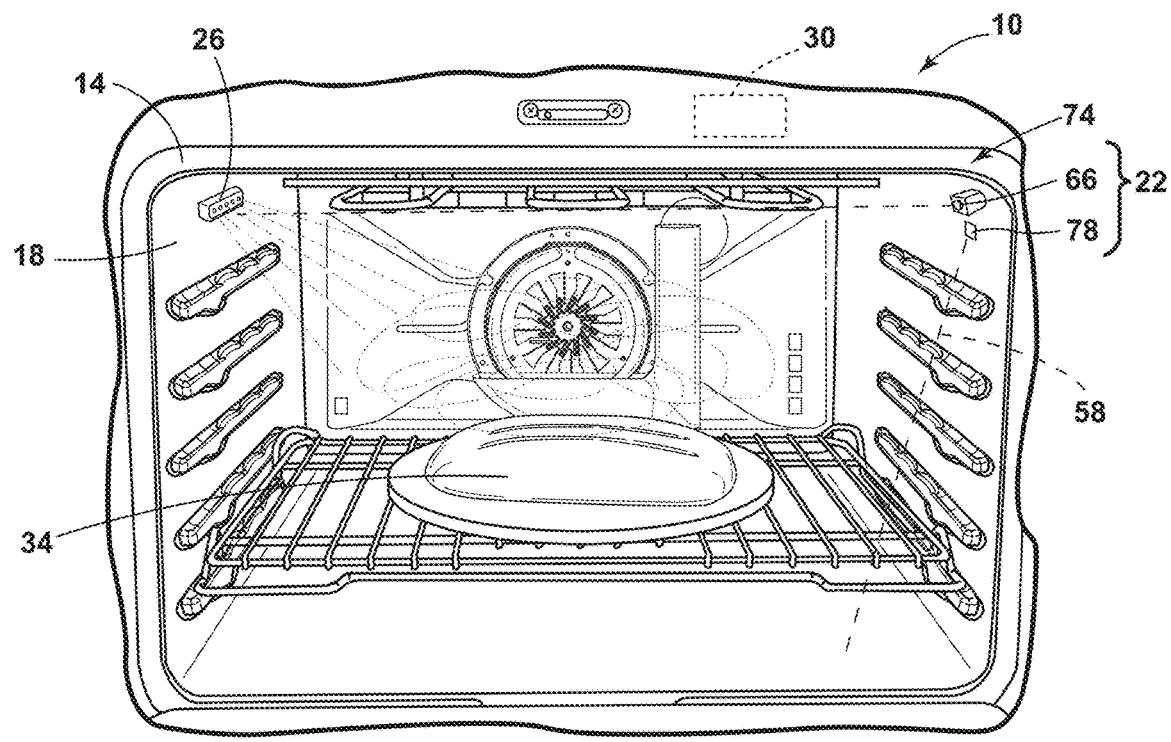
FIG. 5 is a front perspective view of a food substrate in a first growth condition within a cavity of a cooking appliance, according to the present disclosure.
Figure 6:
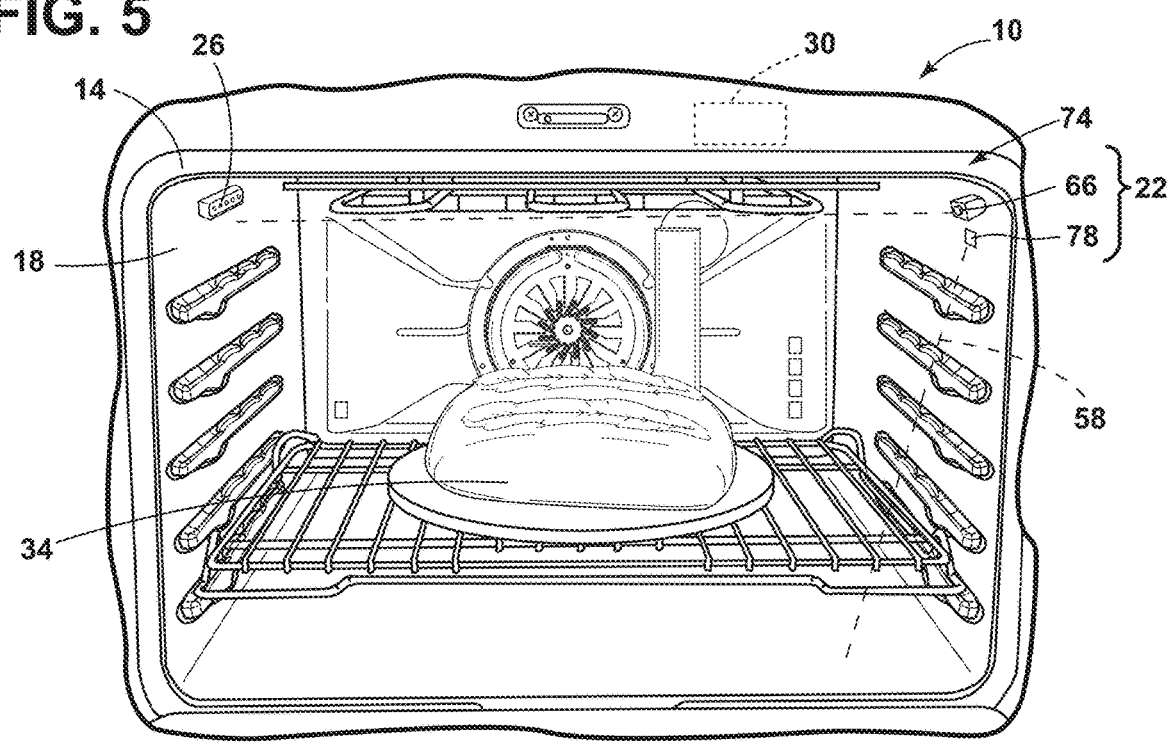
FIG. 6 is a front perspective view of the food substrate of FIG. 5 in a second growth condition.

Referring to FIGS. 5 and 6, the humidifier 26 may be in fluid communication with the first cavity 18 to control the relative humidity within the first cavity 18. In various examples, the sensor 22 may include a humidity sensor 78 that obtains the first data, which can include the relative humidity level, from within the first cavity 18. The cooking appliance 10 may include a single sensor 22, or may include multiple sensors 22 configured to obtain different data. The humidity sensor 78 may be advantageous for maintaining the relative humidity within the first cavity 18 at an optimal level for the food substrate 34. Moreover, the humidity sensor 78 can obtain the first data. The first data can be used to measure and/or estimate the moisture level of the food substrate 34.

In the illustrated example in FIGS. 5 and 6 where the food substrate 34 is bread dough, the relative humidity can affect the development of the bread dough during the proofing process and/or the baking process. Moreover, the relative humidity in the first cavity 18 may reduce surface disruptions from forming on the surface of the food substrate 34, reduce dryness of the food substrate, and/or may promote a volume increase during the proofing process. The humidifier 26 may be activated to increase the relative humidity within the first cavity 18, and may be deactivated in response to certain conditions, such as, for example, an increase in the relative humidity within the first cavity 18, a predetermined amount of time, an increase in volume of the food substrate 34, and/or other aspects of the proofing or baking process.

Figure 7:
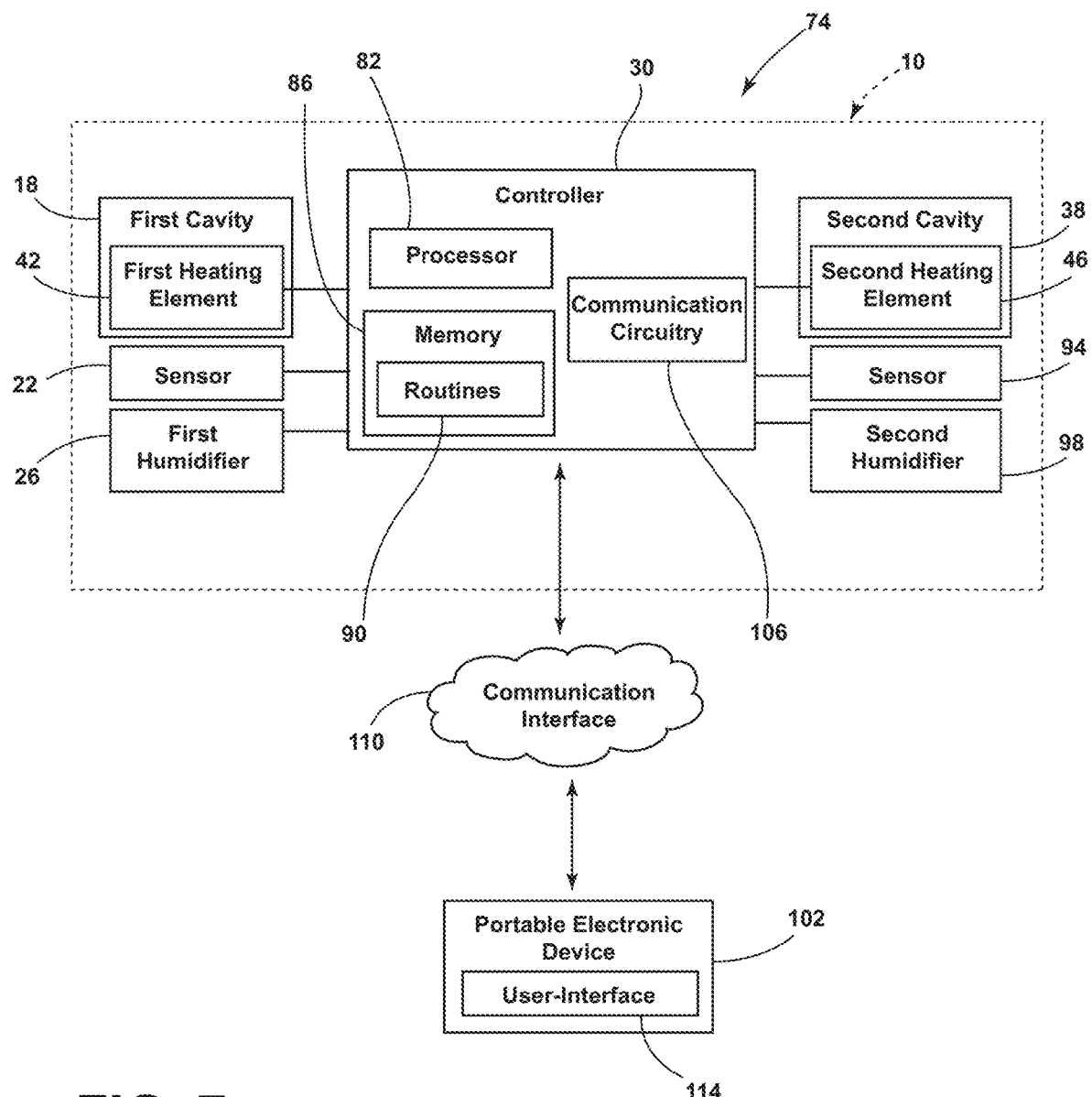
FIG. 7 is a block diagram of a growth monitoring system, according to the present disclosure.

Referring to FIGS. 5-7, the controller 30 may include a processor 82, a memory 86, and other control circuitry. Instructions or routines 90 are stored within the memory 86 and executable by the processor 82. The processor 82 may be configured as a general-purpose processor, microprocessor, microcontroller, an application specific integrated circuit (ASIC), the one or more field programmable gate arrays (FPGAs), central processing unit (CPU), a graphics processing unit (GPU), a group of processing components, or other suitable electronic processing components. The memory 86 may be communicatively coupled to the processor 82 and includes computer code (e.g., data module stored in the memory 86) for executing one or more of the routines 90.

According to various aspects, the controller 30 is in electric communication with the sensor 22 to receive the first data. The first data may include a variety of information relating to the food substrate 34 and/or the cooking appliance 10. In various examples, the first data may include a volume of the food substrate 34. The volume of the food substrate 34 may be detected by the sensor 22 and communicated to the controller 30. The volume can include an initial volume and/or subsequent volume detected after a period of time, from which the controller 30 can calculate a change in volume, percent change in volume and time to reach a predetermined volume expressed as a growth condition that can be related from the sensor 22 to the controller 30. In various examples, the humidifier 98 may be activated by the controller 30 when the volume of the food substrate 34 is less than a predetermined volume. The predetermined volume may be a selected end volume or an intermediate volume stored within the memory 86 of the controller 30. The controller 30 can compare the first data with the predetermined volume stored in the memory 86 and activate the humidifier 26 accordingly.

In non-limiting examples, the predetermined volume may be any practicable volume which can be selected and/or adjusted by the user. The relative humidity within the first cavity 18 may affect the volume growth of the food substrate 34. By activating the humidifier 26, the relative humidity within the first cavity 18 may increase, thereby promoting an increase in the volume of the food substrate 34 and/or avoid restricting growth due to surface dryness. The humidifier 26 may be deactivated by the controller 30 when the volume of the food substrate 34 is substantially equal to the predetermined volume. Stated differently, the controller 30 may include one or more routines 90 to compare the first data received from the sensor 22 to the predetermined volume stored in the memory 86 and determine a change in the condition of the food substrate 34.

Additionally or alternatively, the humidifier 26 may be deactivated by the controller 30 when the sensor 22 detects an increase in the volume of the food substrate 34 of a predetermined percentage over a predetermined period of time. The predetermined percentage may be a volume increase of about 25%, about 50%, about 75%, about 100%, or any other percentage. In various examples, the percentage increase can be determined by the controller 30 using the first data. Additionally or alternatively, the sensor 22 may obtain a second data within the field of detection 58. The second data may include similar information as the first data obtained at a different time, may include different information, and/or a combination thereof. In a non-limiting example, the second data may include a subsequent volume of the food substrate 34 after a predetermined period of time. In such examples, when the controller 30 compares the first data and the second data, one or more of the routines 90 of the controller 30 can determine a percentage of change in the volume of the food substrate 34 over the predetermined period of time. Once the volume of the food substrate 34 increases by the predetermined percentage over the predetermined period of time, the humidifier 26 may be deactivated by the controller 30.

Referring to FIGS. 5-7, the first and/or second data may include the relative humidity level within the first cavity 18. The controller 30 may use the first and second data to determine whether to activate or deactivate the humidifier 26 in response to the relative humidity level, or change thereof, within the first cavity 18. In such examples, if the relative humidity increases to a predetermined level, the humidifier 26 may be deactivated to maintain the relative humidity level within the first cavity 18 at an optimal level for the food substrate 34. Similarly, if the relative humidity level detected by the sensor 22 decreases to a predetermined level, the humidifier 26 may be activated.

According to various aspects, the controller 30 may detect a surface condition of the food substrate 34 using the first and/or second data received from the sensor 22. The surface condition may include at least one of a moisture level and a surface disruption. The controller 30 may activate the humidifier 26 when the controller 30 detects a change in the surface condition of the food substrate 34. In a non-limiting example, the humidifier 26 may be activated when the surface disruption, such as cracks, bubbles, or other undesired surface disruptions, increases to cover a predetermined area of the surface of the food substrate 34. The controller 30 may provide a notification to the user indicating a surface disruption has been detected. The increase in the area of the surface disruption can be detected by the sensor 22 in conjunction with the controller 30. The controller 30 can use the first and second data to determine the increase in the area the surface disruption covers. In this way, the controller 30 has one or more routines 90 that uses the first data and second data to determine whether the surface disruption has remained consistent, has increased, or has decreased.

In an additional or alternative non-limiting example, the humidifier 26 may be activated when the moisture level (e.g., the surface condition) decreases to a predetermined level. The moisture level may be detected by the sensor 22 due to light surface reflections evaluated by the controller 30. The controller 30 can use the first and second data obtained by the sensor 22 to determine the surface moisture level, or a change thereof, of the food substrate 34. The predetermined level may be a moisture level that is sufficiently low, such that the food substrate 34 may not be prepared properly (e.g., proofed, baked, cooked, etc.). In a non-limiting example where the food substrate 34 is bread dough, a low moisture level in the bread dough may prevent sufficient rising during the proofing process and/or baking process.

Figure 8:
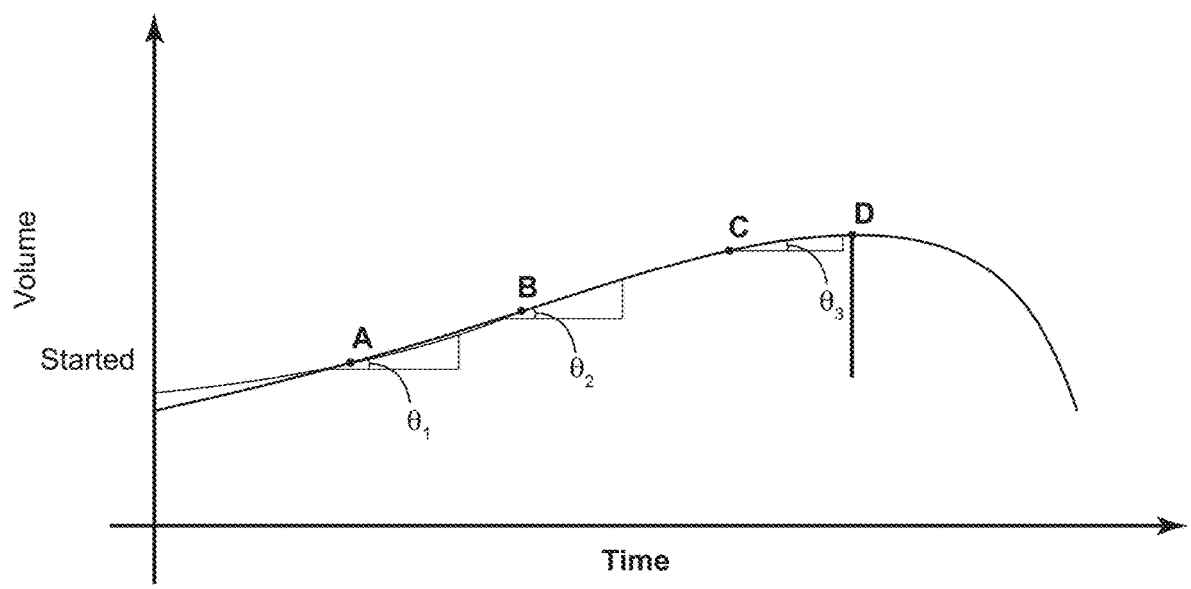
FIG. 8 is a graph illustrating a food substrate volume over a predetermined period of time, according to the present disclosure.

Referring to FIGS. 7 and 8, the first and/or second data may include a rate of volume change of the food substrate 34 (FIG. 2) over a predetermined period of time. In this way, the controller 30 can use the first data and the second data to detect the rate of volume change of the food substrate 34. The volume growth of the food substrate 34 may be determined as a function of time. In the non-limiting example illustrated in FIG. 8, a volume of bread dough is illustrated as a function of time during the proofing process. The food substrate 34 has an initial volume which increases proximate point A at a first rate $\theta_1$. As time progresses, proximate point B, the volume of the food substrate 34 increases at a second rate $\theta_2$, which is less than the first rate $\theta_1$. In this way, the food substrate 34 may quickly increase in volume and then continue to increase in volume at a slower rate over a period of time. In various examples, the food substrate 34 may continue to increase in volume proximate point C, at a third rate $\theta_3$, which is less than the first and second rates $\theta_1$, $\theta_2$ of volume growth. As such, the rate of growth of the volume of the food substrate 34 may slow as the bread dough approaches an optimal proofing end volume proximate point D. The controller 30 may use the first and/or second data obtained by the sensor 22 to determine the rate of volume growth of the food substrate 34 over the predetermined period of time. In this way, the controller 30 can monitor the rate of volume increase of the food substrate 34 over the predetermined period of time. The optimal proofing end volume may be stored in the memory 86 of the controller 30.

Figure 9A:
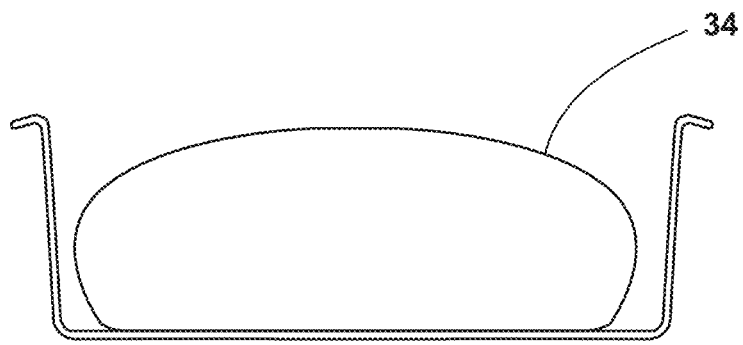
FIG. 9A is a side view of a food substrate in a first growth condition, according to the present disclosure.
Figure 9B:
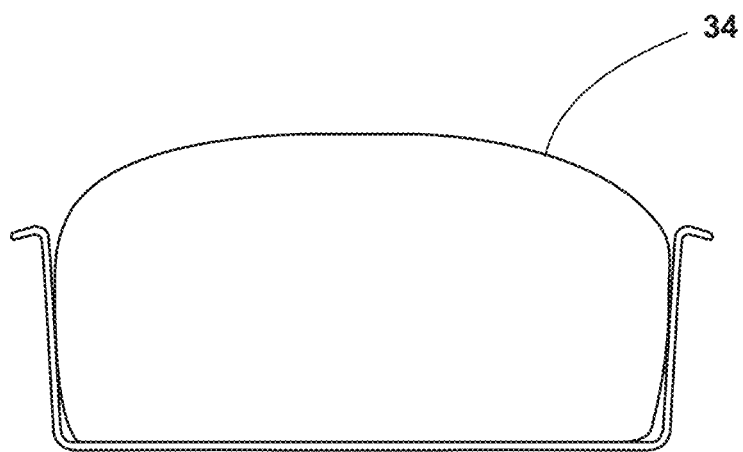
FIG. 9B is a side view of the food substrate of FIG. 9A in a second growth condition.
Figure 9C:
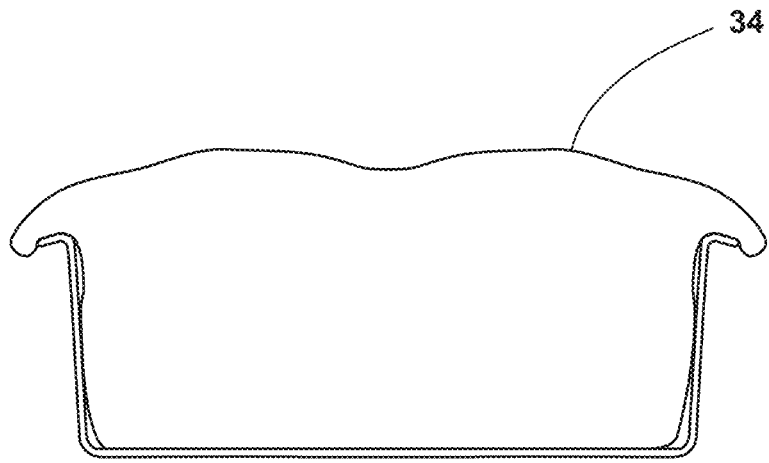
FIG. 9C is a side view of the food substrate of FIG. 9A in a third growth condition.

Referring to FIGS. 9A-9C, the non-limiting example where the food substrate 34 is bread dough is illustrated at different times throughout the proofing process. As illustrated in FIG. 9A, the food substrate 34 has an initial volume. As the food substrate 34 progresses through the proofing process, the volume of the food substrate 34 may increase, as illustrated in FIG. 9B. The food substrate 34 may increase in volume at different rates based on different times in the proofing process. The food substrate 34 may continue to increase in volume until it reaches the optimal proofing end volume. If the food substrate 34 remains in the proofing process after the food substrate 34 reaches the optimal proofing end volume, the food substrate may be overproofed, such that the volume of the food substrate 34 may decrease, as illustrated in FIGS. 8 and 9C.

Referring again to FIGS. 7 and 8, the controller 30 may be in communication with the second cavity 38. The second cavity 38 may include a sensor 94 and a humidifier 98 configured to operate in a similar manner as the sensor 22 and the humidifier 26 of the first cavity 18. The controller 30 may be configured to activate the second heating element 46 to heat the second cavity 38 to a predetermined temperature. In various examples, when the food substrate 34 (FIG. 2) reaches a predetermined end volume and/or a predetermined rate of volume change over a period of time, as determined by the controller 30, the controller 30 may activate the second heating element 46. In this way, the second cavity 38 may reach a predetermined temperature at a time that coincides with the end of the process occurring in the first cavity 18.

In a non-limiting example, the proofing process may occur in the first cavity 18. The controller 30 may determine a growth condition of the food substrate 34. In such examples, when the food substrate 34 increases in volume to a predetermined volume and/or the rate of volume change is reduced to a predetermined rate, the controller 30 may activate the second heating element 46. Once the food substrate 34 reaches the predetermined volume and/or the rate of change thereof, the second cavity 38 may be heated to the predetermined temperature. In this way, the food substrate 34 may be moved directly from the first cavity 18 to the second cavity 38. In examples where the food substrate 34 is bread dough, the direct transfer from the first cavity 18 to the second cavity 38 may prevent overproofing of the bread dough. In such examples, the controller 30 may activate the second heating element 46 when the controller 30 detects the bread dough increasing in volume at the third rate $\theta_3$. In this way, the second cavity 38 can increase to the predetermined temperature as the bread dough reaches the optimal proofing end volume proximate point D.

Figure 10:
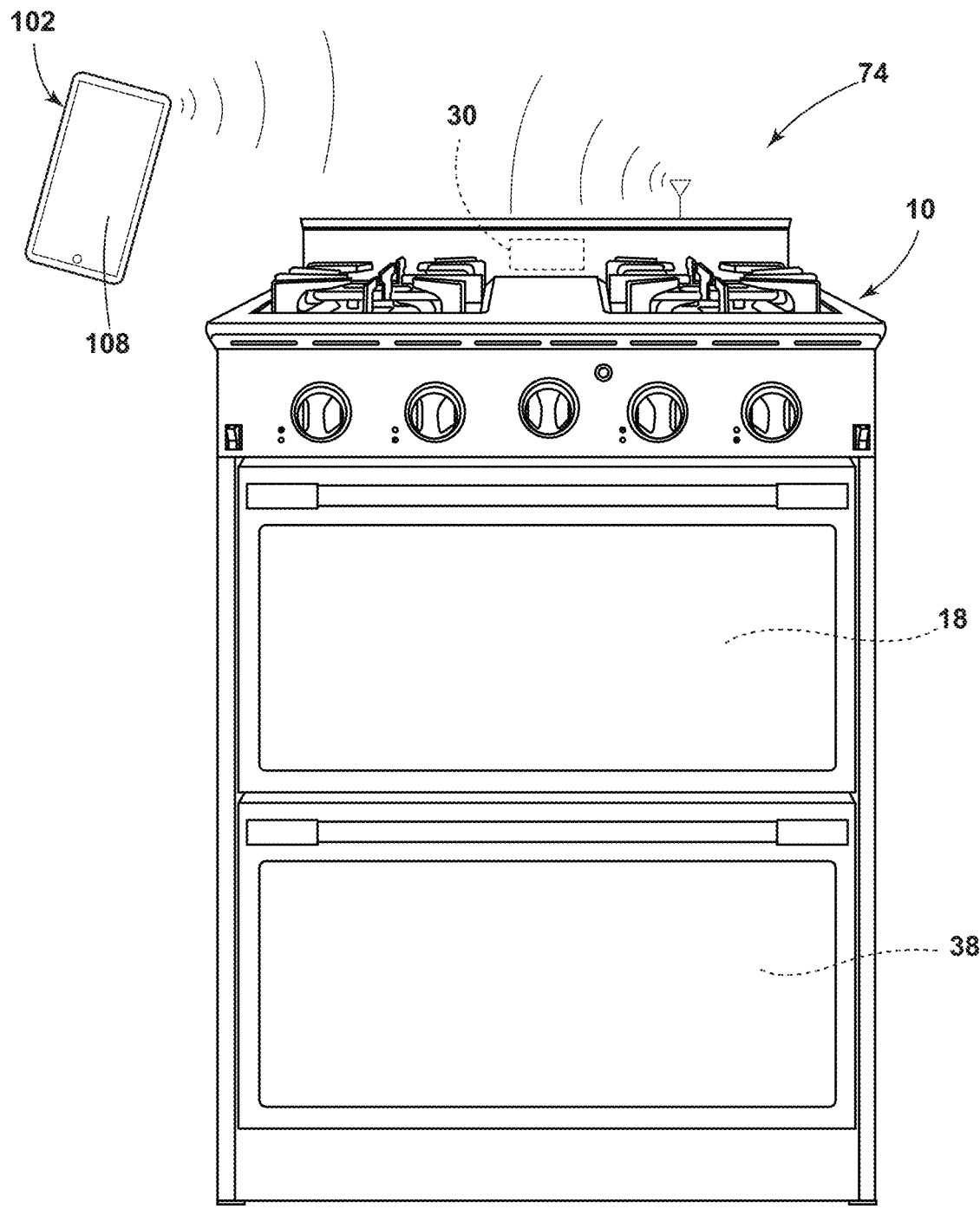
FIG. 10 is a front perspective view of a growth monitoring system having a cooking appliance and a portable electronic device, according to the present disclosure.

Referring to FIGS. 7 and 10, the cooking appliance 10 may be configured to communicate with a portable electronic device 102. The controller 30 may include communication circuitry 106, which may be configured to communicate with the portable electronic device 102, and/or remote servers (e.g., cloud servers, Internet-connected databases, computers, etc.) via a communication interface 110. As illustrated in FIG. 10, the communication interface 110 may be a wireless interface, such that the cooking appliance 10 and the portable electronic device 102 are configured to emit wireless signals. The communication interface 110 may correspond to a variety of communication protocols configured to distribute data among various electronic devices. For example, the communication interface 110 may include an IEEE 802.11 connection, an IEEE 802.15 connection, a Bluetooth® connection, a Wi-Fi connection, a WiMAX connection, cellular signal, signal using shared wireless access protocol cord axis (SWAP-CA), or any other type of radiofrequency or wireless signal. An IEEE 802.15 connection includes any wireless personal area networks (WPAN), such as ZigBee®, Z-wave®, Bluetooth®, UWB, and IrDA. In this way, the communication interface 110 may provide for data communication between the controller 30 and the portable electronic device 102. The portable electronic device 102 may be, for example, a phone, a tablet, a computer, or other electronic device.

The portable electronic device 102 may include a user-interface 114 for receiving the user input to communicate to the controller 30. The user may input commands through the portable electronic device 102 to activate the first and/or second heating elements 42, 46, activate the light source 70, activate the humidifiers 26, 98, and/or controlling other aspects of the cooking appliance 10. According to various aspects, the controller 30 may send a notification to the portable electronic device 102 in response to the first data and/or the second data. In this way, the notification to the user can include information regarding the food substrate 34, the first or second cavities 18, 38, and/or other conditions or operations of the cooking appliance 10.

In a non-limiting example, when the food substrate 34 reaches a predetermined end of volume and/or the food substrate 34 reaches a predetermined rate of volume change over a period of time, the controller 30 may send a notification to the portable electronic device 102 to alert the user of the status of the food substrate 34. This may be advantageous for alerting the user that user interaction with the food substrate 34 may be desired to proceed with the preparation process. In examples where the food substrate 34 is bread dough, the notification may operate as a warning to prevent overproofing of the food substrate 34.

Moreover, the notification may alert the user that the food substrate 34 should be removed from the first cavity 18. In various examples, the portable electronic device 102 may include a display 118 to display the notification. The notification may include the first and/or second data on the display 118. In non-limiting examples, a variety of information can be displayed on the portable electronic device 102, such as, for example, the surface condition of the food substrate 34, the relative humidity level within the first or second cavities 18, 38, the volume of the food substrate 34, the rate of volume change of the food substrate 34 over a period of time, the temperature of the first and second cavities 18, 38, current images or previous images of the food substrate 34, and/or any other aspect of the proofing process, the baking process, or the cooking appliance 10. In various examples, the controller 30 may include one or more routines 90 to convert the first and second data to pixels or images to display on the portable electronic device 102.

In various examples, the monitoring system 74 can be programmed by selecting a recipe. The monitoring system 74 may be programmed via the portable electronic device 102 or any other user-interface associated with the cooking appliance 10. The recipe can be stored within the memory 86 of the controller 30 and may include estimated initial and final volumes for the food substrate 34, among other cooking or proofing parameters. Accordingly, when the user selects a recipe, the initial and final volumes, the rate of volume increase, the estimated surface area disruption, and/or the first and second temperatures can be determined based on the selected recipe. Various parameters of a recipe can include time, heat levels, humidity, etc., and active adjustment of the same.

Figure 11:
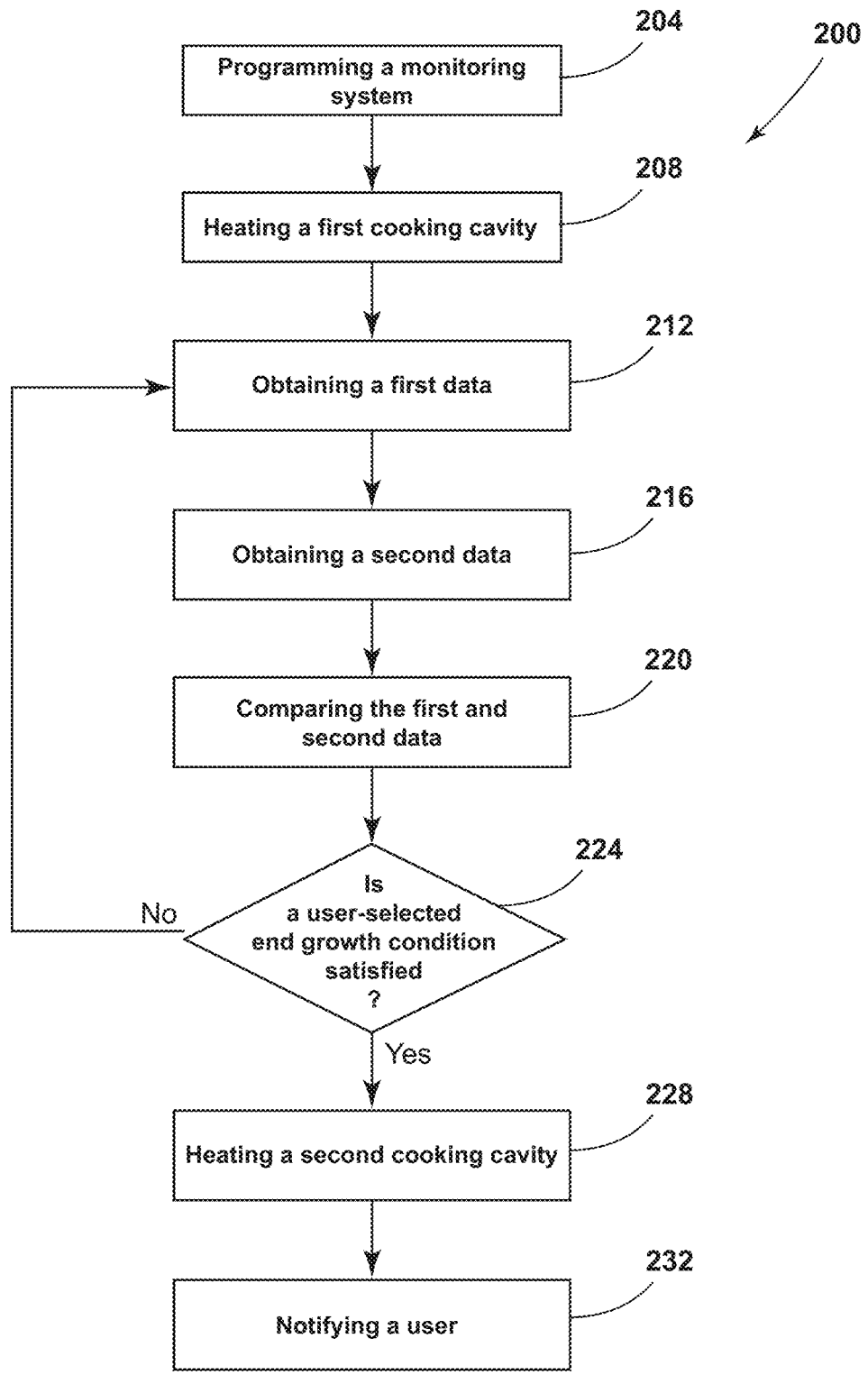
FIG. 11 is a flow diagram of a method of monitoring a food substrate growth, according to the present disclosure.

Referring to FIG. 11, and with further reference to FIGS. 1-10, a method 200 of monitoring growth of the food substrate 34 includes step 204 of programming the monitoring system 74 and/or the cooking appliance 10 with a selected recipe. The recipes, and the specific parameters thereof, can be stored within the memory 86 of the controller and selected via the portable electronic device 102 or another user-interface associated with the monitoring system 74 or cooking appliance 10. The recipe can include estimated initial and end volumes of the food substrate 34 and/or an estimated rate of volume growth. The recipe may also include the first and second temperatures for the first and second cooking cavities 18, 38.

Step 208 of the method 200 may include heating the first cavity 18 to a first temperature. In various examples, the first temperature may be in a range of from about 85° F. to about 90° F. In such examples, the first cavity 18 may be utilized for the proofing process of the food substrate 34. Additionally or alternatively, the first temperature may allow for warming or otherwise preparing, baking, and/or cooking the food substrate 34.

In step 212, the sensor 22 may obtain the first data. The first data may include the surface condition of the food substrate 34, such as, for example, the moisture level of the food substrate 34 and/or the surface disruption on the surface of the food substrate 34. The first data may additionally or alternatively include the relative humidity within the first cavity 18. Additionally or alternatively still, the first data may include image data captured by the sensor 22. The image data may be a picture, a video, a real-time streaming image, or other electronic transmission of image data. In step 212, the first data may be communicated to the controller 30.

In step 216, the sensor 22 may obtain the second data. The second data may be the same information as the first data obtained at a different point in time. For example, the first data may be a first humidity level and the second data may be a second subsequent humidity level. Additionally or alternatively, the second data may be a different type of information. For example, the first data may be the relative humidity level and the second data may be the surface condition of the food substrate 34. In step 216, the second data may be communicated to the controller 30.

In step 220, the controller 30 may use the first and/or second data to detect a growth condition of the food substrate 34. The growth condition may be the surface condition of the food substrate 34. In this way, the growth condition may include the moisture level of the food substrate 34 and/or the surface disruption. Additionally or alternatively, the growth condition may be a volume of the food substrate 34. Moreover, in another non-limiting example, the growth condition may be the rate of volume change of the food substrate 34 over the predetermined period of time. The controller 30 may use the first and/or second data to detect a change in the growth condition of the food substrate 34.

In step 224, the controller 30 can determine whether the growth condition of the food substrate equals a user-selected end condition. The user-selected end condition may be a predetermined volume of the food substrate. Additionally or alternatively, the user-selected end volume may be a predetermined rate of the volume change over the predetermined period of time. In a non-limiting example, the user-selected end condition may be the optimal proofing end volume. According to various aspects, the user-selected end condition may be input by the user through the portable electronic device 102. The user may select the specific growth condition. The user may select a stored program, such as a proofing process or a cooking process. In such examples, the controller 30 may store information in the memory 86 that corresponds with the end growth condition (e.g., volume, rate of volume change, humidity level, etc.). If the food substrate 34 does not equal the user-selected end condition, the method 200 can return to step 208. If the food substrate 34 does equal the user-selected end condition, the method 200 can proceed to step 228.

In step 228, the second cavity 38 may be heated to a second temperature when the growth condition substantially equals the user-selected end condition. The controller 30 may activate the second heating element 46 to heat the second cavity 38. The second temperature may be any temperature sufficient to cook and/or bake the food substrate 34. Additionally, in step 228, the controller 30 may activate the humidifier 26 if the food substrate 34 has not reached the user-selected end growth condition. The humidifier 26 may increase the relative humidity within the first cavity 18, which may assist the food substrate 34 in reaching the user-selected end condition.

In step 232, the controller 30 may notify the user that the growth condition of the food substrate 34 substantially equals the user-selected end condition. According to various aspects, the controller 30 may send a notification to the portable electronic device 102 indicating the growth condition of the food substrate 34. The notification may alert the user that the condition is satisfied and/or that the food substrate 34 may be ready for a next step, such as a removal from the first cavity from the first cavity 18 and/or transfer to the second cavity 38. In step 224, the user may adjust an aspect of the cooking appliance 10 or the cooking process in response to the notification from the controller 30.

Use of the present device may provide for a variety of advantages. The monitoring system 74 may monitor the growth condition and the condition of the first and second cavities 18, 38 automatically. Additionally, the sensor 22 obtains the first and second data, which the controller 30 may use to determine the condition of the food substrate 34. Further, the controller 30 may automatically activate and deactivate the humidifier 26 to create an optimal humidity level within the cooking appliance 10. Moreover, the monitoring system 74 may provide for an automatic notification to the user via the portable electronic device 102. The notification may indicate the growth condition, or another selected condition, of the food substrate 34 and/or the cooking appliance 10. The monitoring system 74 may result in less user interaction during a proofing, baking, and/or cooking process of the food substrate 34. Additional benefits or advantages of using this device may also be realized and/or achieved.

According to an aspect of the present disclosure, a cooking appliance includes a body having a first cavity. A sensor is operably coupled with the first cavity to obtain a first data. A humidifier is in fluid communication with the first cavity to control a relative humidity within the first cavity. A controller is in electric communication with the sensor to receive the first data. The controller detects at least one of a surface condition and a growth condition of a food substrate using the first data.

According to another aspect, a surface condition includes one of a moisture level and a surface area disruption.

According to another aspect, a humidifier is activated by a controller when a surface area disruption increases to a predetermined area.

According to another aspect, a humidifier is activated by a controller when a moisture level decreases to a predetermined level.

According to another aspect, a first data includes a volume of a food substrate.

According to another aspect, a humidifier is activated by a controller when a volume of a food substrate is less than a predetermined volume.

According to another aspect, a humidifier is deactivated by a controller when first data obtained by a sensor includes an increase in the volume of a food substrate of a predetermined percentage over a predetermined period of time.

According to another aspect, a sensor is a depth sensor and first data includes a depth map of a food substrate, and the depth map is at least one of a matrix, a vector, and real-time streaming of depth data.

According to another aspect, a first data includes a rate of volume change of a food substrate over a predetermined period of time.

According to another aspect, a second cavity is disposed within a body and has a heating element. A controller activates the heating element when a rate of volume change of a food substrate decreases to a predetermined rate.

According to another aspect of the present disclosure, a monitoring system for an appliance includes a first cavity. A sensor is operably coupled to the first cavity. The sensor has a field of detection within the first cavity to obtain a first data. A controller is in electric communication with the sensor to receive the first data. The controller detects a rate of volume change of a food substrate using the first data. A user-interface is in communication with the controller to receive a notification in response to the first data.

According to another aspect, a portable electronic device has a user-interface and is in communication with a controller via a communication interface.

According to another aspect, a sensor is an image-based sensor and a first data includes an image captured within a field of detection. The image is at least one of a picture, a video, and real-time streaming of image data.

According to another aspect, a sensor obtains a second data within a field of detection.

According to another aspect, a controller compares a first data with a second data to detect a rate of volume change of a food substrate over a predetermined period of time.

According to another aspect, a humidifier is in fluid communication with a first cavity to control a relative humidity within the first cavity.

According to another aspect, a second cavity has a heating element. A controller activates the heating element when a rate of volume change of a food substrate decreases to a predetermined rate.

According to another aspect of the present disclosure, a method of monitoring food substrate growth includes heating a first cavity to a first temperature. A sensor obtains first data. The sensor obtains a second data. The first and second data are compared to detect a growth condition of a food substrate.

According to another aspect, a second cavity is heated to a second temperature when a growth condition substantially equals a user-selected end condition.

According to another aspect, a user is notified when a growth condition of a food substrate substantially equals a user-selected end condition.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, type of sensor, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
   a body having a first cavity with a first heating element and a second cavity with a second heating element, wherein each of the first cavity and the second cavity includes:
      a light source configured to illuminate the respective cavity;
      a sensor assembly including a humidity sensor and an image-based sensor to obtain image data, and wherein the sensor assembly is configured to sense light surface reflections of a dough food substrate; and
      a humidifier to control a relative humidity; and
   a controller in electric communication with each sensor assembly to receive the image data, the controller having a processor configured to execute routines, and wherein the controller is configured to:
      activate the first heating element to heat the first cavity to a proofing temperature;
      determine surface disruptions formed on an outer surface of the dough food substrate using the image data from the first cavity, wherein the surface disruptions include surface cracks, surface bubbles, or surface cracks and surface bubbles;
      determine a growth condition of the dough food substrate including a rate of volume change over predefined intervals for a predefined period of time using the image data from the first cavity, wherein the rate of volume change includes a first initial rate, a second rate that is less than the first initial rate, and a third rate that is less than the second rate;
      evaluate the light surface reflections sensed by the sensor assembly and a sensed humidity in the first cavity to determine a surface moisture level of the dough food substrate and a change in the surface moisture level;
      activate the humidifier to adjust the rate of the volume change in response to the surface moisture level decreasing to a predetermined level to reduce restriction of growth due to surface dryness;
      evaluate the surface disruptions to determine whether the surface disruptions have remained consistent, increased, or decreased;
      activate the humidifier to reduce formation of additional surface disruptions on the outer surface of the dough food substrate and in response to the surface disruptions covering a predetermined area of the outer surface of the dough food substrate;
      generate an alert when the rate of volume change slows to the third rate of volume change indicative of the dough food substrate approaching a proofing end volume; and
      activate the second heating element when the rate of volume change is determined to be the third rate of volume change to heat the second cavity to a baking temperature higher than the proofing temperature of the first cavity, the second cavity configured to reach the baking temperature proximate to when the dough food substrate reaches the proofing end volume and an end rate of volume change for an end of a proofing process to allow an immediate transfer from the proofing temperature in the first cavity to the baking temperature in the second cavity and, consequently, reduce over proofing of the dough food substrate.

2. The cooking appliance of claim 1, wherein the controller is configured to determine a size of the surface disruptions using the image data.

3. The cooking appliance of claim 1, wherein the sensor assembly includes a depth sensor to obtain a depth map, and wherein the controller is configured to estimate a volume of the dough food substrate using the depth map.

4. The cooking appliance of claim 3, wherein the humidifier is activated by the controller when the volume of the dough food substrate is less than a predetermined volume.

5. The cooking appliance of claim 4, wherein the humidifier is deactivated by the controller when the controller determines an increase in the volume of the dough food substrate is a predetermined percentage over a predetermined period of time using the depth map.

6. The cooking appliance of claim 3, wherein the depth map is at least one of a matrix, a vector, or real-time streaming of depth data.

7. The cooking appliance of claim 1, wherein the controller is configured to determine a percentage of volume change of the food substrate over a predetermined period of time using the image data.

8. The cooking appliance of claim 1, wherein the controller is configured to heat the first cavity to the proofing temperature with the first heating element and the second cavity to the baking temperature with the second heating element, wherein the proofing temperature is between 85° F. and 90° F.

9. The cooking appliance of claim 1, wherein the controller is configured to store the proofing end volume of the dough food substrate.

10. The cooking appliance of claim 1, wherein the alert includes user instructions for removing the dough food substrate from the first cavity.

11. The cooking appliance of claim 10, wherein the alert includes additional user instructions for transferring the dough food substrate to the second cavity.

12. The cooking appliance of claim 1, wherein the rate of volume change over the predefined intervals includes the first initial rate for a first interval, the second rate for a second interval, and the third rate for a third interval, wherein the third rate is indicative of the dough food substrate approaching the proofing end volume.

13. The cooking appliance of claim 1, wherein each image-based sensor is configured to obtain the image data within a field of detection, wherein the fields of detection of the image-based sensors are adjustable by the controller.

14. The cooking appliance of claim 1, wherein the sensor assembly includes a depth sensor to obtain a depth map.

15. The cooking appliance of claim 1, wherein the image-based sensor for the first cavity defines a field of detection that includes the first cavity, and wherein the image-based sensor is configured to receive a signal from the controller based on the image data to change the scope of the field of detection.

16. The cooking appliance of claim 1, wherein the controller is configured to:
estimate a volume of the dough food substrate;
determine a percentage of change in the volume of the dough food substrate over a predetermined period of time; and
deactivate the humidifier when the volume of the dough food substrate increases to a predetermined percentage of change.

17. The cooking appliance of claim 1, wherein the controller is configured to determine an increase in the area the surface disruptions cover.

18. The cooking appliance of claim 1, wherein the controller is configured to generate a notification indicating that the surface disruptions have been detected.

19. The cooking appliance of claim 1, wherein the controller includes a memory and recipes are stored within the memory, and wherein the recipes include estimated initial and final volumes for the dough food substrate.

* * * * *